(12) United States Patent  (10) Patent No.: US 7,394,571 B2
Harrington  (45) Date of Patent: Jul. 1, 2008

(54) METHOD FOR MULTI-COLOR, CLUSTERED, DOT-OFF-DOT HALFTONING

(75) Inventor: Steven J. Harrington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 892 days.

(21) Appl. No.: 10/761,880

(22) Filed: Jan. 21, 2004

(65) Prior Publication Data

US 2005/0157318 A1 Jul. 21, 2005

(51) Int. Cl.
*H04N 1/405* (2006.01)
(52) U.S. Cl. ......................... 358/3.16; 358/2.1; 358/504
(58) Field of Classification Search ................. 358/1.9, 358/2.1, 3.06–3.09, 3.13–3.14, 3.16–3.2, 358/500, 502, 504, 534–536; 347/251–254; 382/237

See application file for complete search history.

(56) References Cited

U.S. PATENT DOCUMENTS

| 4,903,048 | A | | 2/1990 | Harrington | 346/157 |
|---|---|---|---|---|---|
| 5,493,323 | A | | 2/1996 | Harrington | 347/251 |
| 5,543,935 | A | | 8/1996 | Harrington | 358/429 |
| 5,598,204 | A | | 1/1997 | Harrington | 347/251 |
| 5,602,943 | A | * | 2/1997 | Velho et al. | 382/266 |
| 5,855,433 | A | * | 1/1999 | Velho et al. | 382/162 |
| 7,054,038 | B1 | * | 5/2006 | Ostromoukhov et al. | 358/3.13 |

* cited by examiner

*Primary Examiner*—Thomas D Lee
*Assistant Examiner*—Stephen M Brinich
(74) *Attorney, Agent, or Firm*—Jeannette Walder

(57) ABSTRACT

A method for forming a multi-color, clustered dot-off-dot halftone screen, includes defining a range of density values for pixels of a first color and assigning those density values to positions along a pixel growth curve; defining a range of density values for pixels of a second color and assigning those density values to positions along the pixel growth curve; and defining the pixel growth curve, such that a plurality of consecutively filled pixels form a cluster along the curve and such that pixels widely separately along the curve are also widely separated within the halftone cell. Density values for pixels of third and fourth colors may be sequentially assigned to positions along the pixel growth curve.

25 Claims, 3 Drawing Sheets

| 1 | 5 | 3 | 7 | 2 | 6 | 4 | 8 |

|   | 5 | 7 | 6 | 8 |
|---|---|---|---|---|
| 1 | 3 | 2 | 4 |   |

METHOD FOR MULTI-COLOR, CLUSTERED, DOT-OFF-DOT HALFTONING

FIELD OF THE INVENTION

This invention relates generally to methods of digital halftoning, and more particularly to a method of dot-off-dot halftoning which supports multiple colorants.

BACKGROUND OF THE INVENTION

A contone printer uses a combination of dithering or halftoning and printing at different levels of intensity to produce different colors and different shades of lightness and darkness. Contone printers can lay down ink at only a few different levels of intensity (usually only two, ink or no ink). To produce the full range of colors that can be perceived by the human eye, contone printers must also use dithering techniques. Dithering or halftoning creates the illusion of new colors and shades by varying the pattern of black and white dots.

Each pixel value of an array of contone pixels within an area is compared to one of a set of preselected thresholds stored in a repetitive pattern as a halftone matrix or halftone cell. A number of different threshold patterns may be used to describe a halftone cell or dot. These threshold patterns indicate the order in which pixels are switched from white to black to form dots of varying gray density. Typically, a threshold pattern can be classified as either a disperse dot or a cluster dot.

Color halftoning has typically used a dot-on-dot method with rotated halftone screens. The screen pattern for each ink color is rotated at a different angle from the others, with angles chosen to minimize moiré. Much effort has been invested in finding compatible halftone screen patterns, frequencies and angles. The dot-on-dot method achieves different colors by printing one color on top of another. An alternative is a dot-off-dot halftone. Dot-off-dot printing produces different colors by the placement of the dots in side by side relationship. Dot-off-dot methods use a single basic halftone structure and thus eliminate the problem of finding a compatible screen set. They also typically produce a larger color gamut, which is desirable. One problem, however, is that the dot-off-dot approach is sensitive to printer registration. Another issue is a method for creating a desirable clustered-dot screen pattern when there are more than two inks.

There are printing technologies where dot-off-dot methods are practical. Inkjet markers can have excellent registration and can support dispersed dot patterns. Highlight printing using tri-level xerography has perfect registration and uses only two inks. However, other technologies may find dot-off-dot an option in the future as printer registration is improved by better feedback/control methods and/or by electronic registration. Even when the marking technology does support the dot-off-dot approach, there is still the question of how to design a halftone pattern that can be used by three, four or even more colorants. Each colorant must be able to grow to cover the cell area as a clustered dot, yet the overlap must be minimized (the separation maximized).

In printing multi-colored halftoned images it would be desirable to construct the halftone dots with minimal overlap between colors since this gives the largest color gamut. It would also be desirable to separate the colored dots as much as possible to minimize the effects of misregistration. Using a single halftone growth pattern is needed, both to avoid overlap of the dots and to eliminate any moiré effects. Some printing technologies require well formed, compact clustered dots, and a method of achieving these goals for clustered dots when more than two colors are used.

SUMMARY OF THE INVENTION

The method of the invention provides dot-off-dot halftoning that generates minimally overlapping clustered dots for an arbitrary number of colors. The method uses dynamic biasing and limiting of the colorant specifications to assign different colors to different portions of the halftone-filling curve. A space filling curve, such as a Hilbert-like curve, may be used for the filling to generate clustered dots regardless of bias and to make regions separated in the filling sequence also be spatially separated.

A method for forming a multi-color, clustered dot-off-dot halftone screen, according to one aspect of the invention, includes defining a range of density values for pixels of a first color and assigning those density values to positions along a pixel growth curve; defining a range of density values for pixels of a second color and assigning those density values to positions along the pixel growth curve; and defining the pixel growth curve, such that a plurality of consecutively filled pixels form a cluster along the curve and such that pixels widely separately along the curve are also widely separated within the halftone cell. The method may further include defining a range of density values for pixels of a third color and assigning those density values to positions along the pixel growth curve; and defining a range of density values for pixels of a fourth color and assigning those density values to positions along the pixel growth curve.

The various colors can be placed in a filling order which is sequential along the pixel growth curve. For example, the pixels of the second color may follow the pixels of the first color (and so on for the third and fourth colors). Alternatively, the first color pixels can be placed in a filling direction along the curve and the second color pixels can be placed in a filling order along the pixel growth curve which is the reverse of the filling direction of the first color pixels. Also, it may be appropriate to collocate one or more pixels of the first color with one or more pixels of the second color.

Various space filling curves which satisfy the requirements of that a plurality of consecutively filled pixels form a cluster along the curve and such that pixels widely separately along the curve are also widely separated within the halftone cell may be used. A Hilbert curve, for example, may be used. A Hilbert curve is a space filling curve that visits every point in a square grid. The basic elements of a Hilbert curve are "cups" (a square with one open side) and joins (a vector that joins two cups). The open side of the cup can be located at the top, bottom, left or right. In addition, every cup has two end points, and each of these can be an entry point or an exit point.

In accordance with another aspect of the method, the range of density values may be defined such that pixels are added and removed along the pixel growth curve to alter the perceived density of halftone density patterns in accordance with predetermined upper and lower density threshold values. The halftone screen may also be constructed of a plurality of halftone cells, where the pixel growth curve is defined such that when halftone cells are tiled, an end of one curve in one halftone cell connects to a beginning of a curve in an adjacent cell.

A method for converting input image signals to binary image signals, with each input image signal having a pixel density value, in accordance with another aspect of the invention, includes forming a multi-color, clustered dot-off-dot halftone cell by: defining a range of density values for pixels of a first color and assigning those density values to positions along a pixel growth curve; defining a range of density values for pixels of a second color and assigning those density values to positions along the pixel growth curve; and defining the pixel growth curve, such that a plurality of consecutively filled pixels form a cluster along the curve and such that pixels widely separately along the curve are also widely separated within the halftone cell; associating each input image signal with a relative position in the halftone cell having a set of threshold values, with each threshold value being associated with a position in the halftone cell; and assigning a threshold value to each input image signal in accordance with the relative position of each threshold value in the halftone cell.

DETAILED DESCRIPTION DESCRIPTION OF THE EMBODIMENTS

Figure 1:
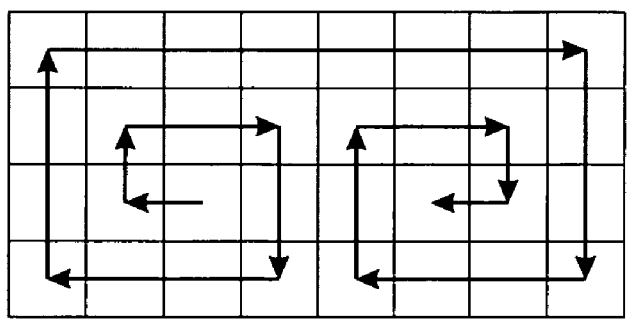
FIG. 1 illustrates a typical spiral growth pattern in a cluster dot.
Figure 2:
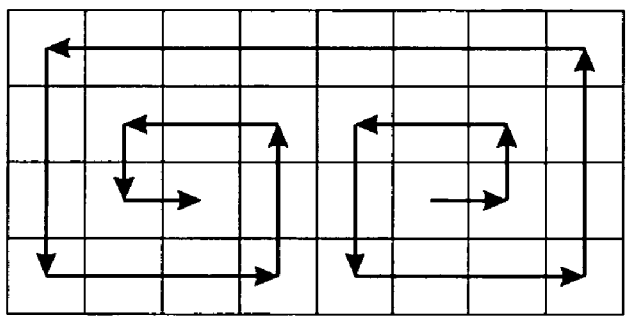
FIG. 2 illustrates reversed growth for a second ink in a cluster dot.

Cluster dot growth patterns often resemble spirals. Pixels are added to the dot in a spiral fashion until the dot grows to half the cell size. Then dots follow a second spiral, filling in the remainder of the cell. FIG. 1 illustrates a typical spiral growth pattern in a cluster dot. U.S. Pat. No. 4,903,048 (for Simulated Color Imaging Using Only Two Different Colorants/Toners) describes how a clustered dot-off-dot halftone for tri-level highlight color can be formed by reversing the growth pattern of the first ink for the second ink. Thus the second ink begins growing in the hole left by the first ink's growth pattern. One ink grows from one end and the second ink grows from the other end, thus the overlap is minimized. Note, however, that since the growth pattern has only two ends, this approach does not generalize to additional inks. FIG. 2 illustrates reversed growth for the second ink.

Figure 3:
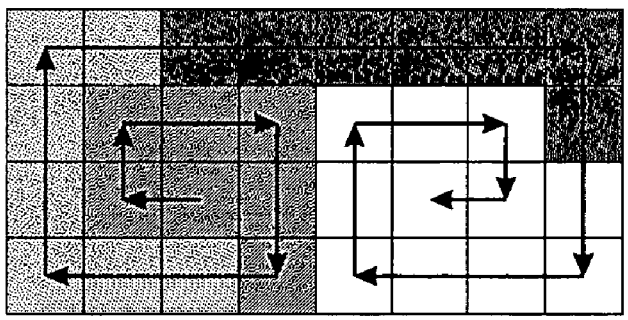
FIG. 3 illustrates sequential filling by the various colors.

U.S. Pat. No. 5,493,323 (for Color Images Having Multiple Separations with Minimally Overlapping Halftone Dots) describes a halftone scheme in which multiple colors can be imaged sequentially along the filling order using a single halftone screen in a manner that minimizes inter-separation overlap. For example, one could assign the first pixels to be filled to the black. The fill could then proceed with magenta pixels and then cyan. This can be done by biasing colorant values with the amounts of the previously imaged colorants, with special handling for cases where a single layer of ink fills the cell and some overlap of the inks must occur. FIG. 3 illustrates sequential filling by the various colors.

However, this technique is sensitive to registration problems. Note that while this method does minimize the overlap of inks, there is nothing to provide well-formed clustered dots (except for the first filling color). Allowing some of the colors to grow in the opposite direction along the same filling curve can be used to create two well formed clusters (just as in the tri-level halftone case) but not more. There is also nothing to keep the various colors separated within the cell, except dispersing the fill order, which defeats dot clustering. The method works adequately for technologies such as ink-jet, that do not require dot clusters, but does not work as well for technologies such as xerography that benefit from dot clustering.

Figure 4:
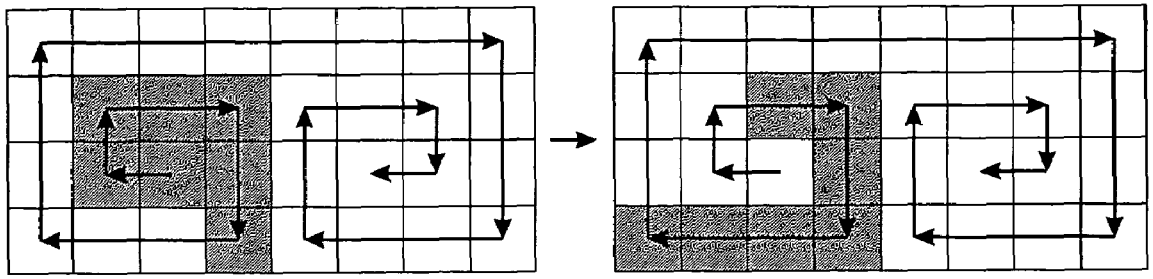
FIG. 4 illustrates sliding the filled pixels along the filling curve.
Figure 5:
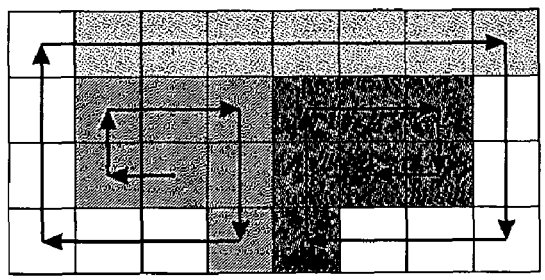
FIG. 5 illustrates distributing colors along the filling curve.

U.S. Pat. No. 5,598,204 (for Image Halftoning System Capable of Producing Additional Gradations) describes a method of generating additional halftone levels by allowing the addition of colored pixels to the halftone cell in the filling order, but also permits removal of pixels from the cell (also in the filling order). This, in effect, allows the n pixels that need to be colored to slide along the filling curve. FIG. 4 illustrates sliding the filled pixels along the filling curve. This technique can be combined with the sequential filling of colors technique to spread out the colors along the filling curve. Thus we can maximally separate the colors along the one dimension of the stretched out filling curve (see FIG. 5). But this alone does not provide separation in the two dimensional halftone cell.

Figure 6:
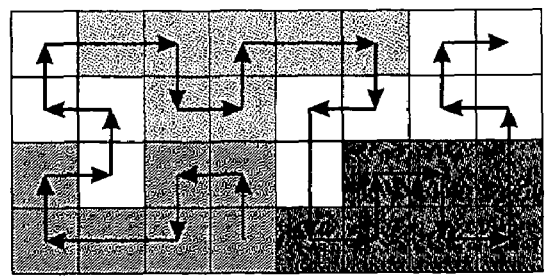
FIG. 6 illustrates distribution of colors along a space-filling curve.

In order to provide multi-color, dot-off-dot halftoning, a filling curve with the property that consecutively filled pixels form a cluster, no matter from where along the curve that sequence of pixels is chosen. To minimize the registration problems the filling curve has the property that pixels widely separated along the curve are also generally widely separated spatially within the cell. Space-filling curves such as the Hilbert curve have these properties. The larger the cell, the more these properties are apparent. FIG. 6 illustrates the distribution of three colors along a space filling curve (shown by the arrows). Threshold values for the first color (typically black) are filled in at the entry point of the curve. These are followed by four uncolored pixels. Then threshold values for the second color are filled in (e.g., cyan). These are followed by three uncolored pixels. Then the threshold values for the third color (e.g., magenta) are filled in along the curve. Note that the filling curve is constructed such that when halftone cells are tiled across the page in an offset brick pattern, the end of one curve connects to the beginning of the curve of the cell above, thus giving a continuity of the layout curve across cells.

The method of the invention, in addition to employing biasing, may further employ upper and lower threshold checking to move the different color components to different sections along the halftone filling curve. The space-filling-like pixel growth curve shape generates local clusters that tend to be spatially separate. Variations on this method include using the reverse curve for some of the colors and the choice of how to divide the uncolored pixels among the separation regions between the colored regions of along the filling curve.

Figures 7, 8, 9:
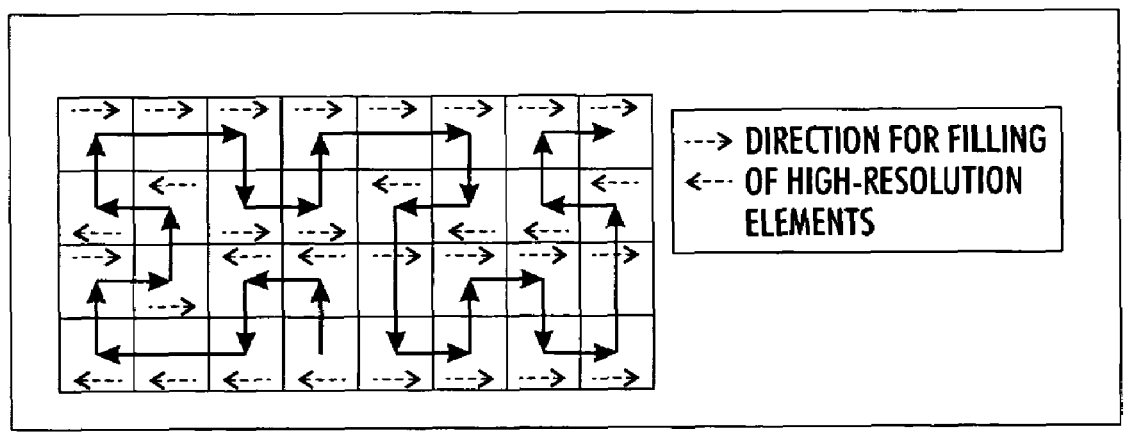
FIG. 7 illustrates mixing of biased cells.
FIG. 8 illustrates distributing biased cells over rows.
FIG. 9 illustrates an extension to pixels with high-addressable subpixels.

A potential problem with the method as described is that a slight variation in the first filled color can shift the bias of the second filled color over a pixel boundary so that it shifts a pixel along the filling curve. This will result in a different cluster shape and most likely a different amount of colorant being deposited. To reduce this problem we can define the halftone as not just a single cell, but a collection of N cells, each shifted or biased from the others slightly along the filling curve. As a result, a slight variation may cause one of the N cells to change the cluster shape instead of all of them. For example, for the 32-pixel cells shown in FIG. 6, the thresholds might typically be {4, 12, 20, 28, 36, 44, 52, 60, 68, 76, 84, 92, 100, 108, 116, 124, 132, 140, 148, 156, 164, 172, 180, 188, 196, 204, 212, 220, 228, 236, 244, 252}. Another cell could be included in the halftone definition where the thresholds are all shifted down by 1: {3, 11, 19, 27, 35, 43, 51, 59, 67, 75, 83, 91, 99, 107, 115, 123, 131, 139, 147, 155, 163, 171, 179, 187, 195, 203, 211, 219, 227, 235, 243, 251}. We could also have a cell for which all the thresholds are incremented by 1. In fact, we could define the halftone as having eight cells, each with a different bias. The position of the cells should be mixed to reduce the appearance of patterns as shown in FIG. 7.

A brick pattern is typically used for the halftone cell in order to generate a 45-degree screen angle (which is least objectionable to the eye). Thus each row of cell may be offset horizontally by half the cell width (or some other amount). The rows can be offset by an additional integral number of cell widths. It makes sense to do this when the halftone is made up of multiple cells each with a different bias. This is so those cells with the same bias are separated vertically as well as horizontally. Also, the bias values can be segmented so that only certain biases occur on certain rows. The motivation is again to avoid the generation of noticeable patterns. FIG. 8 illustrates distributing biased halftone cells over rows.

A code fragment written in C that describes the halftoning threshold tests is as follows:

```
/* halftoning for a pixel with colors c, m, y and k ranging between 0 and 255 */
/* the halftone threshold for the pixel is thr */
/* the thr value would be obtained from an array of threshold values the define the halftone */
f = 255 - k;                /* non-black portion of filling curve */
u = m + C;                  /* portion of curve desired for cyan and magenta */
s = f - u;                  /* what is left if c m and k don't overlap */
if (s < 0)                  /* is there enough room for no overlap */
    s = 0;                  /* if not, the leftover space is zero*/
t = s/4;                    /* set the amount of separation from black to a fraction
                               of the leftover space */
c += cmin = k + t;          /* shift the cyan and find its minimum threshold for the
                               filling curve*/
                            /* magenta will grow in the reverse filling order */
mmin = 255 - t - m;         /* find the lower threshold for magenta */
m = 255 - t;                /* bias the magenta to end at spacing t from end of
                               filling curve */
                            /* yellow is allowed to overlap with magenta and cyan,
                               and is just separated from black */
v = (f - y)/2;              /* space left after yellow and black */
if (t < v)                  /* we prefer the yellow to overlap with cyan */
    v = t;                  /*so shift it if there is more cyan + magenta than there
                               is yellow */
y += ymin = k + v;          /* shift the yellow and find its minimum threshold for
                               the filling curve */
if (c > thr && thr >= cmin) /* if the adjusted cyan specification is within range */
    setCyanPixel( );        /* color the pixel with cyan ink*/
if (m > thr && thr >=mmin)  /* if the adjusted magenta specification is within range
                               */
    setMagentaPixel( );     /* color the pixel with magenta ink*/
if (y > thr && thr >=ymin)  /* if the adjusted yellow specification is within range */
    setYellowPixel( );      /* color the pixel with yellow ink*/
if (k > thr)                /* if the black specification is above threshold */
    setBlackPixel( );       /* color the pixel with black ink*/
```

The method can be further generalized to support devices with high addressability. One way to do this is to maintain the space-filling curve on the array of full-size pixels, but within each pixel sequentially turn on the high-resolution components in the direction of the local filling. FIG. 9 illustrates the extension of subpixels with high-addressable directions shown by dashed arrows. For example, each pixel may be divided into n subpixels. This division may be in one or two dimensions. For each pixel, a subpixel filling order consistent with the pixel growth curve may be defined. Each pixel, in addition to a color threshold assignment may have a high-resolution component defined. The high-resolution component describes the filling of the subpixels. This can take the form of further color threshold assignments for each subpixel.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for forming a multi-color, clustered dot-off-dot halftone cell, comprising:

defining a range of density values for pixels of a first color and assigning those density values to positions along a pixel growth curve;

defining a range of density values for pixels of a second color and assigning those density values to positions along the pixel growth curve; and defining the pixel growth curve, such that a plurality of consecutively filled pixels form a cluster along the curve and such that pixels widely separately along the curve are also generally widely separated spatially within the halftone cell;

wherein the positions of the density values for pixels of the second color follow the positions of the density values for the pixels of the first color.

2. The method of claim 1, wherein a filling direction of the values for pixels of the second color along the pixel growth curve is a reverse of a filling direction of the values for the pixels of the first color along the pixel growth curve.

3. The method of claim 1, wherein at least one pixel value of the second color is located at the same position as at least one pixel value of the first color.

4. The method of claim 1, further comprising defining a range of density values for pixels of a third color and assigning those density values to positions along the pixel growth curve.

5. The method of claim 4, wherein the positions of the density values for pixels of the third color follow the positions of the density values for the pixels of the second color.

6. The method of claim 4, wherein a filling direction of the values for pixels of the third color along the pixel growth curve is a reverse of a filling direction of the values for the pixels of the second color along the pixel growth curve.

7. The method of claim 4, further comprising defining a range of density values for pixels of a fourth color and assigning those density values to positions along the pixel growth curve.

8. The method of claim 1, wherein the pixel growth curve comprises a space filling curve.

9. The method of claim 8, wherein the pixel growth curve comprises a Hilbert curve.

10. The method of claim 1, further comprising defining the range of density values such that pixels are added and removed along the pixel growth curve to alter the perceived density of halftone density patterns in accordance with predetermined upper and lower density threshold values.

11. The method of claim 1, further comprising determining a portion of the halftone cell that would not be covered by some set of colors.

12. The method of claim 11, wherein the set of the colors includes at least two of cyan, magenta and black.

13. The method of claim 11, further comprising separating the portion of the halftone cell that would not be covered by the set of colors into uncolored pixels to be used to separate the colors in the set of colors.

14. The method of claim 1, wherein the first color comprises black and further comprising positioning black at the staff of the pixel growth curve and growing in the forward direction.

15. The method of claim 1, wherein the second color comprises magenta and further comprising growing magenta color in the backward direction.

16. The method of claim 5, wherein the first, second, third and fourth colors comprise black, cyan, magenta and yellow and further comprising positioning cyan, magenta and yellow such that they do not overlap black.

17. The method of claim 1, further comprising a plurality of halftone cells forming a halftone screen, wherein each row of halftone cells is offset horizontally by half a cell width.

18. A method for forming a multi-color, clustered dot-off-dot halftone cell, comprising:
  defining a range of density values for pixels of a first color and assigning those density values to positions along a pixel growth curve;
  defining a range of density values for pixels of a second color and assigning those density values to positions along the pixel growth curve; and
  defining the pixel growth curve, such that a plurality of consecutively filled pixels form a cluster along the curve and such that pixels widely separately along the curve are also generally widely separated spatially within the halftone cell; and
  further comprising a plurality of halftone cells forming a halftone screen and wherein the pixel growth curve is defined such that when halftone cells are tiled, an end of one curve in one halftone cell connects to a beginning of a curve in an adjacent cell.

19. A method for forming a multi-color, clustered dot-off-dot halftone cell, comprising:
  defining a range of density values for pixels of a first color and assigning those density values to positions along a pixel growth curve;
  defining a range of density values for pixels of a second color and assigning those density values to positions along the pixel growth curve; and
  defining the pixel growth curve, such that a plurality of consecutively filled pixels form a cluster along the curve and such that pixels widely separately along the curve are also generally widely separated spatially within the halftone cell, further comprising a plurality of halftone cells forming a halftone screen, wherein each halftone cell is shifted from an adjacent halftone cell small distance along the pixel growth curve.

20. The method of claim 19, wherein each halftone cell in the halftone screen has a different shift distance from all other halftone cells in the halftone screen.

21. A method for forming a multi-color, clustered dot-off-dot halftone cell, comprising:
  defining a range of density values for pixels of a first color and assigning those density values to positions along a pixel growth curve;
  defining a range of density values for pixels of a second color and assigning those density values to positions along the pixel growth curve; and
  defining the pixel growth curve, such that a plurality of consecutively filled pixels form a cluster along the curve and such that pixels widely separately along the curve are also widely separated spatially within the halftone cell; and wherein each pixel is divided into n subpixels.

22. The method of claim 21, wherein the division into subpixels is along only one dimension.

23. The method of claim 21, further comprising assigning a predetermined filling order to the subpixels of a halftone cell pixel.

24. The method of claim 21, wherein a pixel value determines the number of subpixels to be inked according to the color value.

25. The method of claim 21, further comprising determining the filling order in a direction consistent with the pixel growth curve.

* * * * *